(12) United States Patent
Coelho

(10) Patent No.: US 10,110,569 B1
(45) Date of Patent: Oct. 23, 2018

(54) SYSTEMS AND METHODS OF STORING DATA ON A CLOUD-BASED PERSONAL VIRTUAL SERVER

(71) Applicant: CSuite Technologies, Inc., Scottsdale, AZ (US)

(72) Inventor: Rodrigo Coelho, Phoenix, AZ (US)

(73) Assignee: CSuite Technologies, Inc., San Francisco, CA (US)

(*) Notice: Subject to any disclaimer, the term of this patent is extended or adjusted under 35 U.S.C. 154(b) by 71 days.

(21) Appl. No.: 15/094,694

(22) Filed: Apr. 8, 2016

Related U.S. Application Data

(60) Provisional application No. 62/144,521, filed on Apr. 8, 2015, provisional application No. 62/180,970, filed on Jun. 17, 2015.

(51) Int. Cl.
| | | |
|---|---|---|
| *H04L 29/06* | (2006.01) | |
| *H04L 29/08* | (2006.01) | |
| *H04L 12/58* | (2006.01) | |
| *H04L 9/14* | (2006.01) | |
| *H04L 9/08* | (2006.01) | |

(52) U.S. Cl.
CPC ........ *H04L 63/0428* (2013.01); *H04L 9/0861* (2013.01); *H04L 9/14* (2013.01); *H04L 51/08* (2013.01); *H04L 63/06* (2013.01); *H04L 67/06* (2013.01); *H04L 67/10* (2013.01)

(58) Field of Classification Search
CPC ... H04L 63/0428; H04L 63/06; H04L 9/0861; H04L 9/014; H04L 51/08; H04L 67/10; H04L 67/06
USPC ........................................................ 713/150
See application file for complete search history.

(56) References Cited

U.S. PATENT DOCUMENTS

| | | | | |
|---|---|---|---|---|
| 5,199,070 A | * | 3/1993 | Matsuzaki | ............ H04L 9/3013 380/30 |
| 2008/0132215 A1 | * | 6/2008 | Soderstrom | ......... H04L 12/1818 455/416 |
| 2009/0300152 A1 | * | 12/2009 | Ferris | .................... G06F 9/5072 709/223 |

OTHER PUBLICATIONS

Li, Ming, et al. "Securing Personal Health Records in Cloud Computing: Patient-Centric and Fine-Grained Data Access Control in Multi-owner Settings." SecureComm. vol. 10. 2010.*

* cited by examiner

*Primary Examiner* — Syed A Zaidi
(74) *Attorney, Agent, or Firm* — Booth Udall Fuller, PLC

(57) ABSTRACT

Computerized systems and methods for storing data on a cloud-based personal virtual server are disclosed herein. Systems and methods may include a mobile device of a user comprising a processor configured to: receive a user's personal information; receive the first user's password, generate a secret key, a personal public key, and a personal private key for the user; launch a new server instance on a cloud-service provider to create a cloud-based personal virtual server for the first user on the cloud-service provider, the personal virtual server being segregated from other servers on the cloud-service provider; and transmit the personal information, the personal public key, and the password of the first user to the cloud-based personal virtual server for storage.

22 Claims, 5 Drawing Sheets

SYSTEMS AND METHODS OF STORING DATA ON A CLOUD-BASED PERSONAL VIRTUAL SERVER

CROSS REFERENCE TO RELATED APPLICATIONS

This document claims the benefit of the filing date of U.S. Provisional Patent Application 62/144,521, entitled "Personal Cloud Application for Mobile Devices" to Rodrigo Coelho, which was filed on Apr. 8, 2015, the contents of which are hereby incorporated by reference. This document also claims the benefit of the filing date of U.S. Provisional Patent Application 62/180,970, entitled "Personal Cloud Application for Mobile Devices" to Rodrigo Coelho, which was filed on Jun. 17, 2015, the contents of which are hereby incorporated by reference.

BACKGROUND

1. Technical Field

Aspects of this document relate generally to systems and methods of storing data on a cloud-based personal virtual server from an application on a mobile device.

2. Background Art

Conventional cloud storage services are configured to allow multiple users access a single service. The single service then accesses a plurality of virtual machines on the servers, storage, and networks of that particular single service. These public clouds include commercial resources where millions of users log into shared servers. Often times, the only protection given on these public clouds is a username and password. There is no protection that the cloud service provider cannot scan the text of your personal documents, such as email hosts scanning email text for targeting advertising purposes. There is no additional protection against the public cloud provider being hacked, resulting in sensitive information being stolen or otherwise made public.

SUMMARY

According to an aspect of the disclosure, a computerized system for storing data on a cloud-based personal virtual server may comprise a first mobile device of a first user comprising a processor configured to receive a first user's personal information, the first user's personal information comprising the phone number for the first mobile device, the first user's email address, and the mobile device identification of the first mobile device, receive the first user's password, generate a secret key, a personal public key, and a personal private key for the first user, launch a new server instance on a cloud-service provider to create a cloud-based personal virtual server for the first user on the cloud-service provider, the personal virtual server being segregated from other servers on the cloud-service provider, and transmit the personal information, the personal public key, and the password of the first user to the cloud-based personal virtual server for storage.

Particular embodiments may comprise one or more of the following features. The processor of the first mobile device of the first user may further be configured to transmit the secret key and the personal private key of the first user to the personal virtual server, and the system further comprises a second device comprising a processor configured to access data stored on the personal virtual server by receiving the first user's password and downloading the secret key and the personal private key of the first user to the second device. The processor of the first mobile device of the first user may further be configured to generate a file key to encrypt a file, upload the encrypted file to the personal virtual server, and download the encrypted file from the virtual server to the first mobile device of the first user and decrypt the file using the file key. The processor of the first mobile device of the first user may further be configured to transmit a request to a second user to learn a personal public key of the second user, transmit an email to the second user, the email comprising the personal public key of the first user as an attachment to the email and a first security code, transmit a text message to the second user, the text message comprising the personal public key of the first user and a second security code, receive a ciphertext in an email from the second user, the ciphertext comprising a personal public key for the second user and encrypted by the mobile device of the second user using the personal public key of the first user and chosen ciphertext attack (CCA)-secure public key encryption scheme, import the ciphertext and decrypt the ciphertext encrypted by the mobile device of the second user, verify an email address and phone number of the second user, and that the ciphertext was received within a predetermined time, accept the personal public key of the second user after verifying the email address and phone number of the second user, and that the ciphertext was received within a predetermined time, and store the personal public key of the second user and personal information of the second user in at least one of the personal virtual server and the mobile device of the first user. The processor of the first mobile device of the first user may be further configured to, encrypt the file key using a public-key encryption scheme and the personal public key of the second user and upload the encrypted file key to the personal virtual server, and transmit an access link to the second user, the access link configured provide the second user with access to the encrypted file on the personal virtual server. The system may further comprise a first mobile device of the second user comprising a processor configured to access and download the encrypted file on the personal virtual server of the first user, recover the file key using a personal private key of the second user, decrypt the encrypted file with the file key. The processor of the first mobile device of the first user may be further configured to encrypt a message using the second user's personal public key and a CCA-secure public-key encryption scheme, the message comprising at least one of a text message and an email message, and send the encrypted message to the second user. The processor may be further configured to establish a temporary shared key for the first user and the second user by having the first user encrypt the temporary shared key using the personal public key of the second user. The processor may further be configured to prompt the first user move the personal virtual server to a new datacenter in a location proximate the first user, and prompt the first user to split portions of data on stored on the personal virtual server such that a single file in the personal virtual server is stored in a plurality of datacenters.

According to an aspect of the disclosure, a computerized method of storing data on a cloud-based personal virtual server may comprise receiving, with a processor on a mobile device of a first user, the first user's personal information, the first user's personal information comprising the phone number for the first mobile device, the first user's email address, and the mobile device identification of the first mobile device, receiving, with the processor on the mobile device of the first user, a password for the first user, generating, with the processor on the mobile device of the first user, a secret key, a personal public key, and a personal private key for the first user, launching, with the processor on the mobile device of the first user through a communication network, a new server instance on a cloud-service provider to create a cloud-based personal virtual server for the first user on the cloud-service provider, the personal virtual server being segregated from other servers on the cloud-service provider, and transmitting, with the processor on the mobile device of the first user through the communication network, the personal information, the personal public key, and the password of the first user to the cloud-based personal virtual server for storage.

Particular embodiments may comprise one or more of the following features. Generating, with the processor on the mobile device of the first user, a file key to encrypt a file, uploading, with the processor on the mobile device of the first user through the communication network, the encrypted file to the personal virtual server, and downloading, with the processor on the mobile device of the first user through the communication network, the encrypted file from the virtual server to the first mobile device and decrypt the file using the file key. Transmitting, with the processor on the mobile device of the first user, the secret key and the personal private key of the first user to the personal virtual server, receiving, with a processor on a second device of the first user, the first user's password, downloading, with the processor on a second device of the first user through the communication network, the secret key and the personal private key of the first user to the second device. Transmitting, with the processor on the mobile device of the first user through the communication network, a request to a second user to learn a personal public key of the second user, transmitting, with the processor on the mobile device of the first user through the communication network, an email to the second user, the email comprising the personal public key of the first user as an attachment to the email and a first security code, transmitting, with the processor on the mobile device of the first user through the communication network, a text message to the second user, the text message comprising the personal public key of the first user and a second security code, receiving, with the processor on the mobile device of the first user through the communication network, a ciphertext in an email from the second user, the ciphertext comprising a personal public key for the second user and encrypted by the mobile device of the second user using the personal public key of the first user and chosen ciphertext attack (CCA)-secure public key encryption scheme, importing, with the processor on the mobile device of the first user through the communication network, the ciphertext and decrypt the ciphertext encrypted by the mobile device of the second user, verifying, with the processor on the mobile device of the first user, an email address and phone number of the second user, and that the ciphertext was received within a predetermined time, accepting, with the processor on the mobile device of the first user, the personal public key of the second user after verifying the email address and phone number of the second user, and that the ciphertext was received within a predetermined time, and storing, with the processor on the mobile device of the first user, the personal public key of the second user and personal information of the second user in at least one of the personal virtual server and the mobile device of the first user. Encrypting, with the processor on the mobile device of the first user, the file key using a public-key encryption scheme and the personal public key of the second user, uploading, with the processor on the mobile device of the first user through the network, the encrypted file key to the personal virtual server, and transmitting, with the processor on the mobile device of the first user through the communication network, an access link to the second user, the access link configured provide the second user with access to the encrypted file on the personal virtual server. Downloading, with a mobile device of the second user, the encrypted file on the personal virtual server of the first user, recovering, with the mobile device of the second user, the file key using a personal private key of the second user, decrypting, with the mobile device of the second user, the encrypted file with the file key. Encrypting, with the processor on the mobile device of the first user, a message using the second user's personal public key and a CCA-secure public-key encryption scheme, the message comprising at least one of a text message and an email message, and sending, with the processor on the mobile device of the first user through the communication network, the encrypted message to the second user. Establishing, with the processor on the mobile device of the first user, a temporary shared key for the first user and the second user by having the first user encrypt the temporary shared key using the personal public key of the second user. Prompting, with the processor of the mobile device of the first user, the first user to move the personal virtual server to a new datacenter in a location proximate the first user, and prompting, with the processor of the mobile device of the first user, the first user to split portions of data on stored on the personal virtual server such that a single file in the personal virtual server is stored in a plurality of datacenters.

According to an aspect of the disclosure, a computerized method of storing data on a cloud-based personal virtual server may comprise receiving, with a processor on a mobile device of a first user, the first user's personal information, the first user's password and personal information, the personal information comprising the phone number for the first mobile device, the first user's email address, and the mobile device identification of the first mobile device, and launching, with the processor on the first mobile device of the first user through a communication network, a new server instance on a cloud-service provider to create a cloud-based personal virtual server for the first user on the cloud-service provider, the personal virtual server being segregated from other servers on the cloud-service provider.

Particular embodiments may comprise one or more of the following features. Generating, with the processor on the mobile device of the first user, a secret key, a personal public key, and a personal private key for the first user, transmitting, with the processor on the mobile device of the first user through the communication network, the personal information, the personal public key, and the password of the first user to the cloud-based personal virtual server for storage, generating, with the processor on the mobile device of the first user, a file key to encrypt a file, and uploading, with the processor on the mobile device of the first user through the communication network, the encrypted file to the personal virtual server.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

Figure 1:
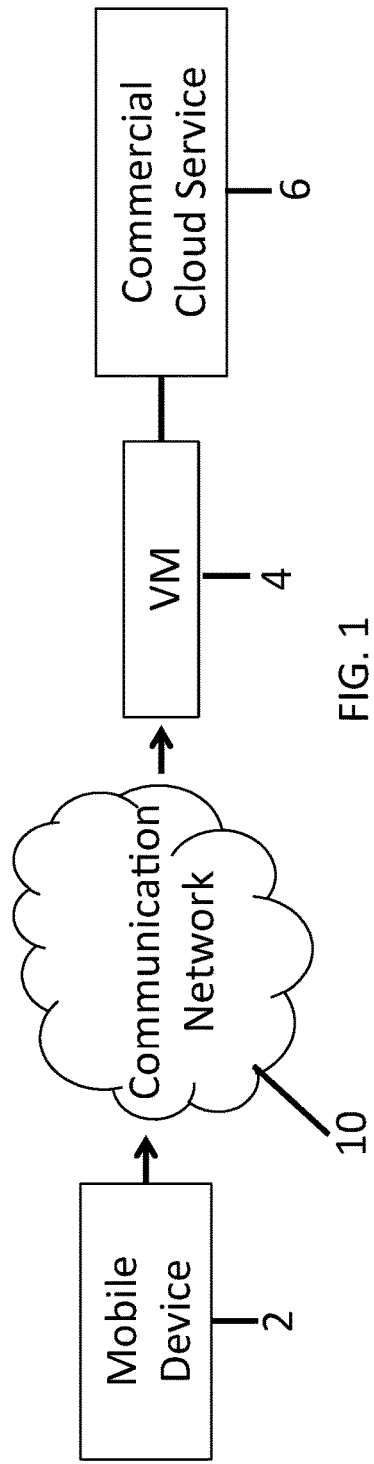
FIG. 1 is a block diagram of a cloud-based virtual machine (VM) instantiated on a commercial cloud service with a mobile device.

This disclosure, its aspects and implementations, are not limited to the specific components or assembly procedures disclosed herein. Many additional components and assembly procedures known in the art consistent with the systems, methods and/or assembly procedures will become apparent for use with implementations from this disclosure. Accordingly, for example, although particular electronic devices are disclosed, such electronic devices and implementing components may comprise any shape, size, style, type, model, version, measurement, concentration, material, quantity, and/or the like as is known in the art for such electronic device and implementing components, consistent with the intended operation of the electronic device.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary," "example" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In order to provide a context for the various aspects of the disclosed subject matter, a general description of a suitable environment in which the various aspects of the disclosed subject matter may be implemented. While the subject matter is described throughout this document in the general context of computer-executable instructions of a program that runs on one or more computers, those skilled in the art will recognize that the subject innovation also may be implemented in combination with other program modules. Generally, program modules include routines, programs, components, data structures, etc., that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, virtual machines, virtual private servers, cloud servers (such as private, public, and hybrid clouds), redundant array of independent disks (RAID) and RAID levels, and the like. Thus, while reference may be made to a mobile device 2 throughout this document, the mobile device 2 may refer to any hand-held computing device. It is also contemplated that the mobile device 2 may, in some instances, include any other computer system described herein, or may be limited specifically to a "smart phone" mobile device 2. The illustrated aspects may also be practiced in distributed computing environments where tasks are performed by remote processing devices that are linked through a communications network 10. However, some, if not all aspects of the subject matter can be practiced on stand-alone computers. In a distributed computing environment, program modules may be located in both local and remote memory storage devices.

Moreover, any computer or electronic device disclosed herein may comprise a series of multiple computers or electronic devices. According to some aspects, the mobile device includes a processing unit or processor, a system memory, and a system bus. The system bus couples system components including, but not limited to, the system memory to the processing unit. The processing unit can be any of various available microprocessors. It is to be appreciated that dual microprocessors, multi-core and other multiprocessor architectures can be employed as the processing unit.

The system memory includes volatile and nonvolatile memory. The basic input/output system (BIOS), containing the basic routines to transfer information between elements within the computer, such as during start-up, is stored in nonvolatile memory. By way of illustration, and not of limitation, nonvolatile memory can include read only memory (ROM) in some cases. Volatile memory includes random access memory (RAM), which can act as external cache memory to facilitate processing.

Any of the electronic devices referenced herein may also include removable/non-removable, volatile/non-volatile computer storage media, such as but not limited mass storage. Mass storage includes, but is not limited to, devices like a magnetic or optical disk drive, floppy disk drive, flash memory, Internet cloud memory, or memory stick. In addition, mass storage can include storage media separately or in combination with other storage media.

Various implementations of the disclosures presented herein may comprise software application(s) that act as an intermediary between users and/or other computers and the basic computer resources described in suitable operating environment. Such software application(s) include one or both of system and application software. System software can include an operating system, which can be stored on mass storage, which acts to control and allocate resources of the administrator computer system. Application software takes advantage of the management of resources by system software through program modules and data stored on either or both of system memory and mass storage. Database data may be stored in system memory, mass storage, or some other storage associated with the administrator computer. Software application(s) may also be installed and utilized on any mobile device or computer, as shall be described in greater detail below.

The disclosures of this document may also include one or more interface components that are communicatively coupled to the bus and facilitate interaction with the other devices. By way of example, the interface component can be a port (e.g., serial, parallel, PCMCIA, USB, FireWire, and the like) or an interface card (e.g., sound, video, network, and the like) or the like. The interface component can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer to output device(s) via interface component. Output devices can include displays (e.g., CRT, LCD, plasma, projection, and the like), speakers, printers and other computers, among other things.

Where the examples, embodiments and implementations provided herein reference mobile devices, cellular phones, cellular phone networks and other cellular phone examples, it should be understood by those of ordinary skill in the art that other phone types, networks, any other telephony devices and examples could be intermixed or substituted with those provided. Routing of communication connections between various communications devices may be done similar to the examples provided above relating to a phone service network. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

It will be understood that implementations are not limited to the specific components disclosed herein, as virtually any components consistent with the intended operation of a method and/or systems disclosed herein may be utilized. Accordingly, for example, although particular mobile devices and computers may be disclosed, such components may comprise any shape, size, style, type, model, version, class, grade, measurement, concentration, material, weight, quantity, and/or the like consistent with the intended operation of a method and/or system implementation. In places where the description below refers to particular implementations of systems and methods, it should be readily apparent that a number of modifications may be made without departing from the spirit thereof and that these implementations may be applied to other systems and methods.

Various embodiments contemplated in this disclosure allow a person using a mobile device to launch, instantiate, configure, and manage a "personal cloud" for storing and access files. More particularly, services (including personal cloud software) may be instantiated directly on infrastructure as a service (IaaS) provider. As used herein a "personal cloud" is distinct from a "public cloud." A personal cloud refers to resources that are not shared with other individuals. Instead, the resources are on a separate piece or pieces of hardware, which might be in the user's home, a data center, or some combination thereof, and allows the user to securely store and synchronize files, calendars, contacts, and emails with various devices. In contrast, public clouds include commercial resources where millions of users log into shared servers, such as Google Drive, Dropbox, Box, etc. Often times, the only protection given on these public clouds is a username and password. There is no protection that the company providing the public cloud services cannot scan the text of your personal documents, such as email hosts scanning email text for targeted advertising purposes. There is also no additional protection against the public cloud provider being hacked, resulting in sensitive information being stolen or otherwise made public.

A personal cloud computer application operable on a mobile device, such as a smart phone, is advantageous for various reasons. First, the general population is spending increasing amounts of time on mobile devices. Second, users' data is often in the hands of third parties, leaving the users vulnerable to hacking, security breaches, and snooping. And third, the costs associated with cloud computer are falling significantly. Some contemplated embodiments also allow for extreme data security because a user will be able to divide data between cloud providers in a virtual redundant array of independent disks (RAID) configuration, with the data spread across multiple cloud providers. In such embodiments, the data may also be encrypted both during transfer and during storage. In one or more embodiments, an application operating on a processor of a mobile device 2 is configured to prompt the user to split portions of data on stored on the personal virtual server 4 such that a single file in the personal virtual server is stored in a plurality of datacenters. Thus, a portion of a document may be stored in one datacenter, another portion in a second datacenter, and another portion in a third center. RAID technology and Shamir secret sharing may be utilized so that no single portion of a document can be opened or read without all other portions. The software controller running in the personal virtual server 4, in combination with the software in the mobile device 2, may coordinate the splitting and recombining of the data when the user wishes to access the data.

As shall be described in greater detail below, one or more embodiments of a mobile device application contemplated herein allow a user to launch a remote server instance from a mobile device. This will then launch a configurable advanced machine interface (AMI) that may include software services such as but not limited to email, contact management, calendar services, document management, and the like. The mobile device application will allow a user to connect to and manage these services. According to some aspects, a single mobile application will support multiple commercial or private cloud providers, and will allow for data synchronization between these disparate clouds. Various embodiments are also configured to allow a user to manage network configurations such as but not limited to Dynamic DNS and network address management from the mobile device application. Beyond personal clouds, aspects of the contemplated mobile device applications may be applied to government agencies that require secure storage of files and data.

In conventional cloud-based services, multiple users access a single service, such as Dropbox, Box, Google, etc. The single service then accesses a plurality of virtual machines on the servers, storage, and networks of that particular single service. FIG. 1 depicts a non-limiting embodiment of a block diagram of a cloud-based virtual server 4 or virtual machine (VM) instantiated on a commercial cloud service 6 with a mobile device 2. In one or more embodiments, a mobile device 2 may comprise a web application thereon configured to instruct a processor of the mobile device 2 to instantiate a personal virtual server 4 or virtual machine, and then choose where that personal virtual server 4 will be housed. Although FIG. 1 depicts only the virtual server 4 being housed in a single commercial service, it is contemplated that the virtual server 4 may be housed across multiple commercial services 6 or even other personal servers. Thus, even though the virtual server 4 is housed on a commercial service 6, other users would not be connected to the same personal virtual server, but instead be segregated from the personal server 4 of the individual user.

According to some aspects, the application is configured to allow a user to launch a virtual server 4 in a data center, and then configure his/her own email server, storage server, or any other server, and then access that server through his/her mobile device 2. This allows the end user to interact directly with the user's segregated portion of the hardware of the data center service provider from the user's mobile device 2. Thus, embodiments of an application may connect to a server container, then set up virtual server 4 there. Although reference is made in this document to personal clouds, it is also contemplated that end users may orchestrate and manage applications and services from their mobile device 2 across multiple cloud services 6. For example, a user may manage the transfer of data from one cloud to another cloud. Such a configuration is advantageous in areas or countries where data is required by law to be stored within the country. In one or more embodiments, an application operating on a mobile device of a user is configured to prompt the user to move the personal virtual server 4 to a new datacenter in a location proximate the user. If the user wishes to move the personal virtual server to a new datacenter, the processor is configured to instruct that the virtual server be moved to a new datacenter proximate the user to reduce latency.

In one or more embodiments, a mobile device 2 may comprise a web application thereon configured to instruct a processor of the mobile device 2 to allow a user to instantiate a personal virtual server 4 separate from other commercial and private clouds, while still accessing files, documents, and the like from other clouds. According to some aspects, an application is configured for use with any of a variety of platforms, such as but not limited to any other platform available to a user through an app store. One or more embodiments of an application according to this disclosure is configured to provide interface tools that allow for access to contacts, calendars, documents, emails, and the like. As described above, an application may be further configured to access public services to create a personal cloud. More particularly, an application may access private connects to PaaS services and/or private services creators to IaaS. A personal virtual server 4 created by a personal cloud application on a mobile device 2 may be drawn from the user's own cloud and custom services IaaS, as well as commercial services AWS, RAX, AZURE Paas. In one or more embodiments, an application operating on the mobile device 2 of a user instructs the processor to allow the user to access conventional personal services (such as email, social media, and other cloud services), instantiate a personal cloud sever 2 for enterprises and more secure files, and/or direct or deploy files for storage on any number of different commercial cloud services 6.

In one or more embodiments, an application on a mobile device 2 may be configured to instruct a processor on the mobile to device 2 instantiate a personal cloud virtual server 4 for user of the mobile device application. In so doing, a user may select what files are stored on the newly instantiated cloud based personal virtual server 4, pull files from other clouds, and/or deploy files to desired clouds. In one or more embodiments, the application is configured to allow the user to organize data into one or more groups, such as but not limited to personal, enterprise, and secure. The application may be configured to display a submenu responsive to selection of an item on the menu. For example, a user may select personal sphere, followed by selecting personal email, at which point the application may display on the screen of the mobile device entry boxes for email username and password screen. After submission of the email username and password, the application may be further configured to display the main menu again, and/or display the email account of the user. An application may be configured such that after entering the email username and password, a user may select to set up notifications. The notifications may include but are not limited to one or more commercial public cloud services. A user may then select to sync the calendar and contacts.

In one or more embodiments, the application is configured to allow a user to determine where the files and other data will be stored. Storage may include but is not limited to any commercial public cloud service 6 or, alternatively, the application may instantiate a personal cloud server as described elsewhere in this document. An embodiment of the application may be configured to display a submenu that appears if a user selects the secure group. A user may select a preferred cloud service and then select an associated file or files with the service. In one or more embodiments, an application is configured to allow a user to select a deployment location of the file or files selected. According to some aspects, a deployment location is the location where a user chooses to launch a personal cloud. Some deployment locations may require entering of a username and password. In some embodiments, an application is configured such that a menu may appear after a user selects documents on the submenu referenced above. If, for example, a user selects a commercial cloud service, the user may be required to enter in his/her username and password. If a user selects a personal cloud server 4, the user may then select a deployment location for the file from the personal cloud server 4. For deployment location, a user may be required to enter a username and password.

Also contemplated as part of this disclosure is an application or system that layers a security model on top of any of the personal cloud embodiments described herein.

According to some aspects, an application is configured to allow a user to instantiate a virtual server 4, and then that virtual server acts as the user's key administration for encryption. Such a configuration allows a user on a mobile device 2 or home computer to encrypt communications to third parties in the user's contacts list without requiring the user to utilize current public/private key infrastructure and exchange keys. Instead, an application or system contemplated herein allows a user to authenticate himself/herself and the user's device 2 with the user's personal cloud server 4. The application or system is further configured to then send invites to the user's contacts to download the application and authenticate themselves with the user's personal cloud server 4. The user's server allows no access to third parties unless invited by the user and acts as an authentication bridge between the user and the user's contacts.

The application may be further configured to allow a user to utilize a local client to encrypt communications, such but not limited to messages, VOIP, documents, emails, and the like, before the communications leave the user's device. The encrypted communications may be sent via public channels, such as but not limited to SMS, Gmail, and the like. The application, therefore, is configured to secure and protect the contents of the user's communications. When the encrypted communication is received by the user's contact, the client application on the user's contact's device verifies that the person receiving the encrypted communication is indeed the user's contact via a software token, passphrase, or biometrically. The application may be further configured to verify that the device of the user's contact is registered with the user's personal cloud. According to some aspects, it is only after that the device and/or user's contact have been verified that the user's contact may decrypt the encrypted communication.

According to one aspect, an application on a mobile device 2 is configured to instruct a processor on the mobile device to instantiate a person virtual server 4 or virtual machine with a cloud service 6 and key administrator on an Iaas provider of the user's choice through a communication network 10. Instantiation of a virtual server 4 and establishment of a personal server may be according to any of the previous instantiations described herein.

Figure 2:
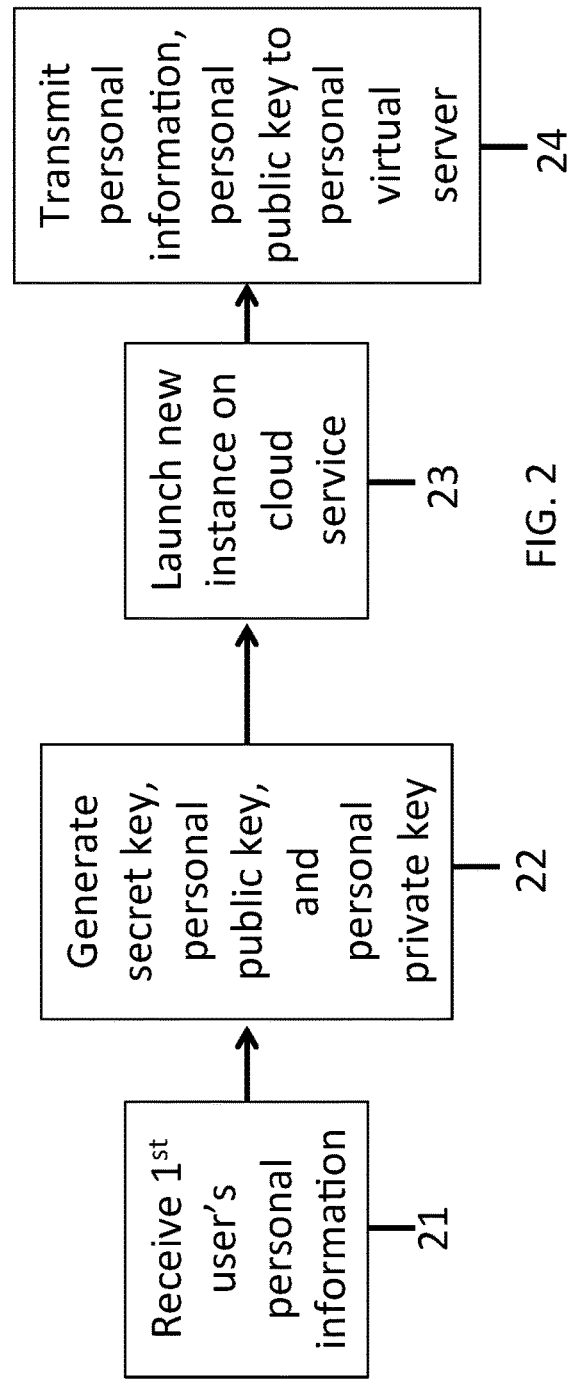
FIG. 2 is a flowchart of systems and methods for initial setup of a personal virtual server.

More particularly, various embodiments of a system or method for initiating a cloud-based virtual server 4 or storing data on a cloud-based personal virtual server 4 may comprise at least a first mobile device 2 of a first user, the first mobile device 2 comprising a processor. The processor is configured to download a copy of the application through the network 10 or from memory. According to some aspects, a user may have an account or subscription to a commercial cloud service 6. FIG. 2 depicts a flowchart of a non-limiting embodiment of systems and methods contemplated herein for initial setup of a personal virtual server 4. The application may be configured such that when a user downloads the application to the mobile device 2, the processor prompts a user to enter and then receive on the mobile device 2 the user's personal information 21. The personal information may comprise the phone number for the mobile device, the user's email address, the mobile device identification, and/or the user's password. The application may be further configured to generate a secret key ($K_A$), a personal public key ($PK_A$), and personal private key ($SK_A$) specifically for the user 22. According to some aspects, the secret key and the personal public key are stored in password-protected form on the user's mobile device 2 when the application is not in use.

Once the application is downloaded and installed on the mobile device 2, the application may be configured to instruct the processor to launch a new server instance 23 on a cloud service 6 to create a cloud-based personal virtual server 4 for the user on the cloud service 6. The personal virtual server 6 is segregated from other servers on the cloud service 6. An application may be configured to instruct the processor to transmit the personal information, the personal public key, and the password of the first user to the cloud-based personal virtual server 4 for storage 24. The user may login to the personal virtual server 4 with the user's password. In some embodiments, a secure password-based key-exchange protocol may be used. In other alternative embodiments, a user may store a copy of a password-protected long-term key that is shares with the user's personal virtual server 4.

Figure 3:
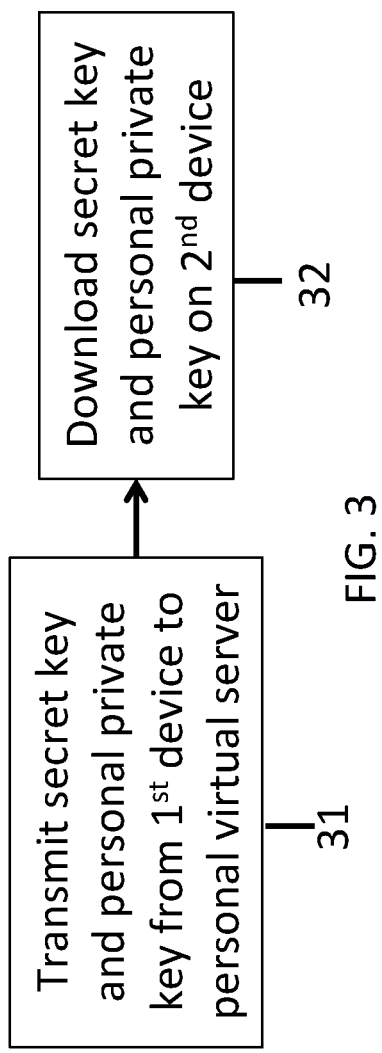
FIG. 3 is a flowchart of systems and methods for accessing data from the personal virtual server from a second device of the user.

In one or more embodiments, a system is configured to allow a user to access data from the personal virtual server 4 from another or second device, as shown in the non-limiting flowchart of FIG. 3. To enable access from another, second device, an application of this disclosure is configured to instruct a processor to upload or transmit the password-protected secret key and personal private key 31 to the personal virtual server 6. A user may then login to the personal virtual server 4 on a second device, and the application (being installed on the second device) is configured instruct the processor to download and decrypt the password-protected secret key and personal private key 32. Once these keys have been downloaded and decrypted on the second device, a user has access to the data stored on the personal virtual server according to some embodiments of this disclosure. In some instances, a user may want to establish a personal public key and a personal private key without a personal virtual server. According to some embodiments, then a user may use the application to enter his/her personal information and generate keys only.

An application may be further configured to allow a user to authenticate and configure keys. The application is further configured to allow a user to begin encrypting documents, files, communications, and the like on the user's mobile device and then storing the documents, files, communications, and the like in the user's personal virtual server 4 or also in public cloud providers 6.

Figure 4:
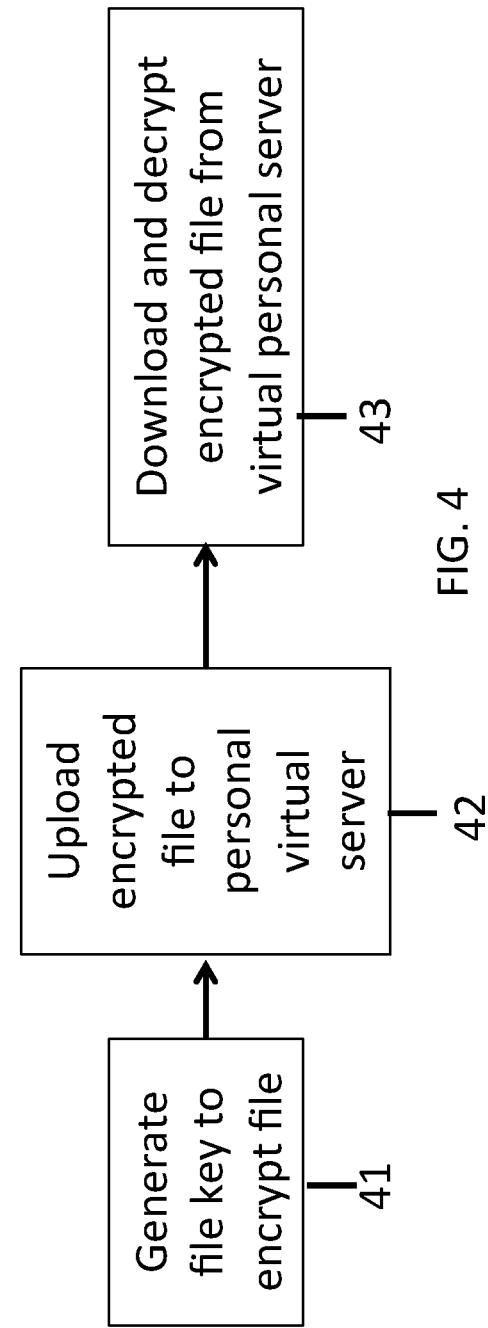
FIG. 4 is a flowchart of systems and methods for uploading and downloading files.

More particularly, various embodiments of a system or method for initiating a cloud-based virtual server 4 or storing data on a cloud-based personal virtual server 4 may comprise a processor on a mobile device 2 configured to upload and download files as described in detail below. FIG. 4 is a flowchart of a non-limiting embodiment of systems and methods for uploading and downloading files from the personal virtual server. The uploading and downloading of files may, according to some aspects, assume that the user has already authenticated to his/her personal virtual server 4, as described above. To upload a file F from the user's mobile device 2 to the personal virtual server 4 of the user, the application may be configured to instruct the processor to generate a file key ($k_F$) 41. In some embodiments, the file key does not repeat and may be generated randomly or pseudorandomly. If the file key is generated randomly, generating the file key may comprise collecting sufficient entropy from the user's mobile device 2. If the file key is generated pseudorandomly, generating the file key may comprise using the user's long-term secret key and other variables, such as but not limited to the current date and/or current time. In one or more embodiments, the file may be encrypted locally as:

$$\text{hdr}\|\text{ctext}=(A,\text{sym},\text{Enc}_{KA}(kF))\|\text{Enc}_{kF}(F)$$

where A designates this particular (or first) user, Enc denotes a symmetric-key encryption scheme, hdr is the header, and ctext is the ciphertext. While reference is made to a symmetric-key encryption scheme, it is further noted that authenticated encryption may be used. Once the file is encrypted, the application may be configured to instruct the processor to upload the encrypted file 42 to the personal virtual server 4 on the cloud service 6 through a communication network 10. According to some aspects, an encrypted file comprises any number of headers followed by a ciphertext, and is not limited to the encryption provided above.

Various embodiments contemplated in this disclosure are further configured to allow a user to download an encrypted file from his/her personal virtual server 4. To download an encrypted file, an application may be configured to instruct the processor to allow a user (A) to search for a header (hdr=(A,*,*) containing its own identity, and then download that header plus the ciphertext (ctext) to the mobile device 2 of the user. If the second component of the header is "sym", then the system is configured such that the processor may decrypt the third component of the header using its long-term secret key in order to recover the file key. The application may be configured to then instruct the processor to decrypt the ctext using the file key to recover the original file 43.

An application may be further configured to allow a user to add trusted contacts. According to some aspects, an application comprises one or more "circles of trust" lists and allows a user to add certain contacts to the one or more circle of rrust lists. The application is configured to allow contacts of the user with the application and on a user's circle of trust lists to authenticate with the user's personal virtual server 4. When a user's contact has authenticated with the user's personal virtual server 4, the application is configured to allow a user's contact to decrypt encrypted documents, pictures, video, email, messages, VOIP, and the like.

Figure 5:
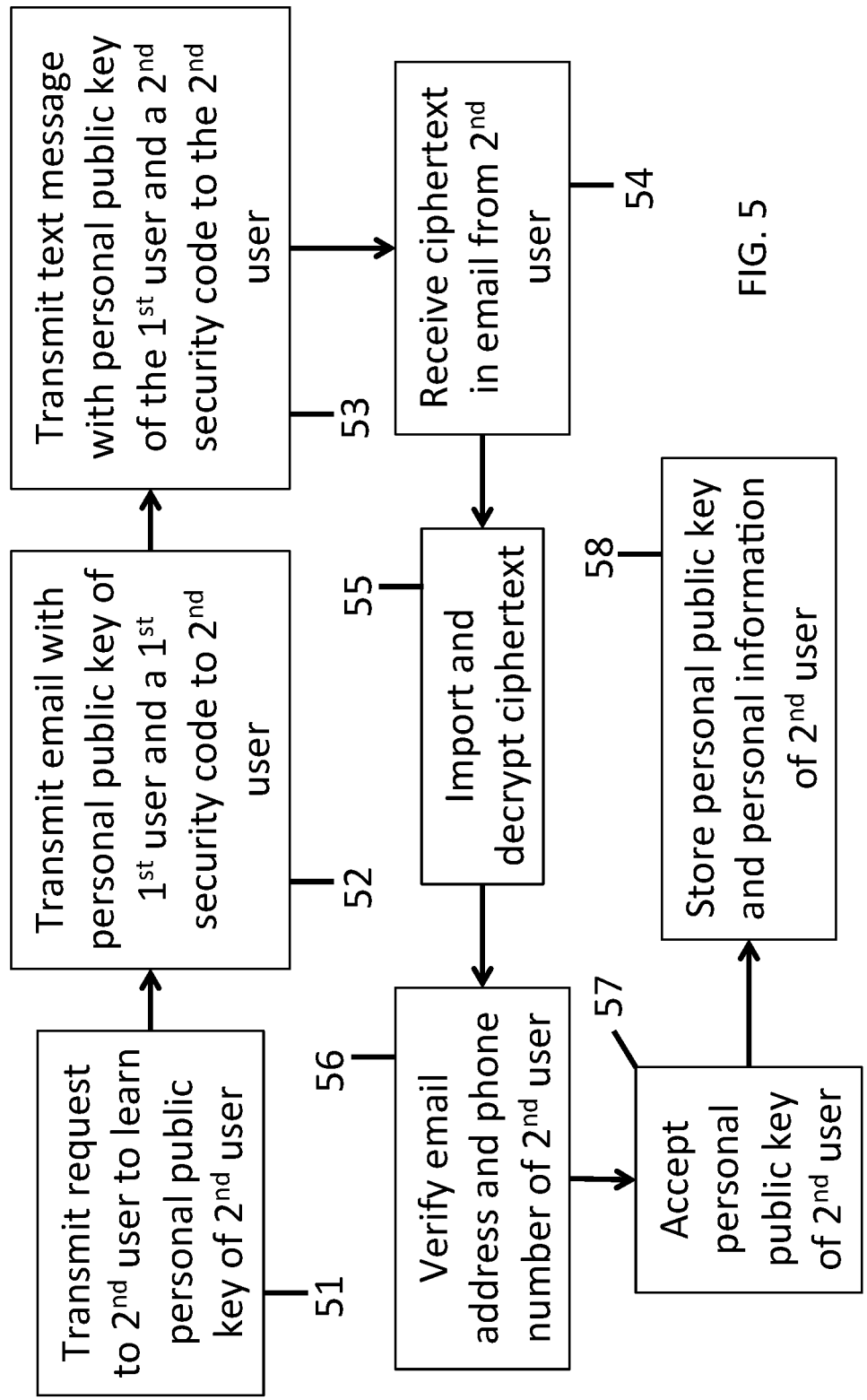
FIG. 5 is a flowchart of systems and methods for learning public keys of other users.

More particularly, various embodiments of a system or method for initiating a cloud-based virtual server 4 or storing data on a cloud-based personal virtual server 4 may comprise a processor on a mobile device 2 configured learn, discover, or otherwise store the public key of other use. FIG. 5 is a flowchart of a non-limiting embodiment of a system and method for learning personal public keys of other users. Various mechanisms for exchanging personal public keys of users are contemplated. The various mechanism include tradeoffs in terms of security and ease-of-use. The application may support multiple mechanisms for exchanging keys, either based on user preference or in different (economy or premium) versions of the application. In some embodiments, an assumption is made that an attacker cannot simultaneously eavesdrop on both a text message and an email sent from one user to another, nor can an attacker modify either of these messages in transit.

In one or more embodiments, an application is configured to instruct a processor on a mobile device 2 of the first user to notify a second user that the first user wants to learn the second user's personal public key. Thus, the application is configured to instruct the processor on the mobile device 2 of the first user to transmit a request to a second user to learn a personal public key of the second user 51. The second user may have already downloaded the application to the mobile device of the second user, or may download the application upon receipt of the request. When the second user has downloaded the application, the second user has a personal public key ($PK_B$) and a personal private key ($SK_B$). It is noted that the second user (B) does not have to establish a personal virtual server in order to communicate securely with the first user. The second user may then notify the first user via email, text, or any other method that he/she is ready to being the key exchange.

In one or more embodiments, an application is configured to transmit an email to the second user 52, the email comprising the personal public key of the first user as an attachment to the email and a first security code ($code_1$). The application may be further configured to instruct the processor on the mobile device of the first user to alternatively or additionally transmit a text message to the second user 53, the text message comprising the personal public key of the first user and a second security code ($code_2$). Upon receipt of the text and/or email messages, the second user verifies that the personal public key of the first user matches in both the text and the email. If so, then the process of the mobile device of the second user is configured to import the personal public key into the application operating on the mobile device of the second user. In addition, the second user may be prompted by the application to enter the first security code and the second security code received from the first user. The application operating on the mobile device of the second user may be configured to then encrypt $PK_B \| code_1 \| code_2 \| ID_B$, (where $ID_B$ denotes the second user's personal information) using the personal public key of the first user and a ciphertext attack (CCA)-secure public-key encryption scheme. The application operating on the mobile device of the second user is further configured to transmit the resulting ciphertext as an email attachment and/or text message to the first user.

One or more embodiments of an application operating on a mobile device of the first user are further configured to instruct the processor to receive the ciphertext in the email from the second user 54. As described above, the ciphertext may comprise a personal public key for the second user and encrypted by the mobile device of the second user using the personal public key of the first user and chosen CCA-secure public key encryption scheme. Upon receipt, the encrypted ciphertext may be imported and decrypted 55 on the mobile device 2 of the first user. The application may be further configured to verify an email address and phone number of the second user 56, and that the ciphertext was received within a predetermined time (such as but not limited to 1 minute, 5 minutes, 10 minutes, or any other time predetermined by the user). If the ciphertext was received within the predetermined time, the processor on the mobile device 2 of the first user may be configured to accept the personal public key of the second user 57 after verifying the email address and phone number of the second user and store the personal public key of the second user and personal information of the second user 58 in at least one of the personal virtual server and the mobile device 2 of the first user.

It is noted that a similar methods and systems may be utilized if the second user wanted to learn A's personal public key. It is further noted that the second user may not simply accept the personal public key of the first user as valid after the steps described above because the second user has no assurance that the message came from A. In some embodiments, the second user may not need a copy of the first user's personal public key in order to receive encrypted documents, emails, or text messages from the first user, unless the second user also wants verification that the first user is the source.

The above described systems and methods may be advantageous because it is unlikely that an attacker can eavesdrop on both the text message and the email message sent from the first user to the second user. It is also unlikely that the attacker can prevent the text message or the email from being delivered to the second user. The attacker may learn one of the first security code or the second security, but it is unlikely that an attacker could learn both the first security code and the second security code. This remains true even if the attacker injects arbitrary messages to the second user, since those messages cannot depend on the code that the second user does not know. CCA-security of the encryption from the second user to the first user ensures also that the attacker cannot generate a modified ciphertext that will cause the first user to accept an incorrect key for the second user.

These and other embodiments contemplated and described herein are advantageous to other systems and methods because the personal virtual server may act as an authenticator between the first and second users, with no $3^{rd}$ party involvement. Conventional encryption systems use centralized servers controlled by $3^{rd}$ parties. In some of the embodiments contemplated herein, the first user and the second user (or more users) are authenticated with the personal virtual server 4 that is controlled by the originator (first user). Thus, the second user can trust and authenticate that the request came from the first user using the two-factor scheme described above and below. Alternatively, authentication may be accomplished in-person or over the phone.

Figure 6:
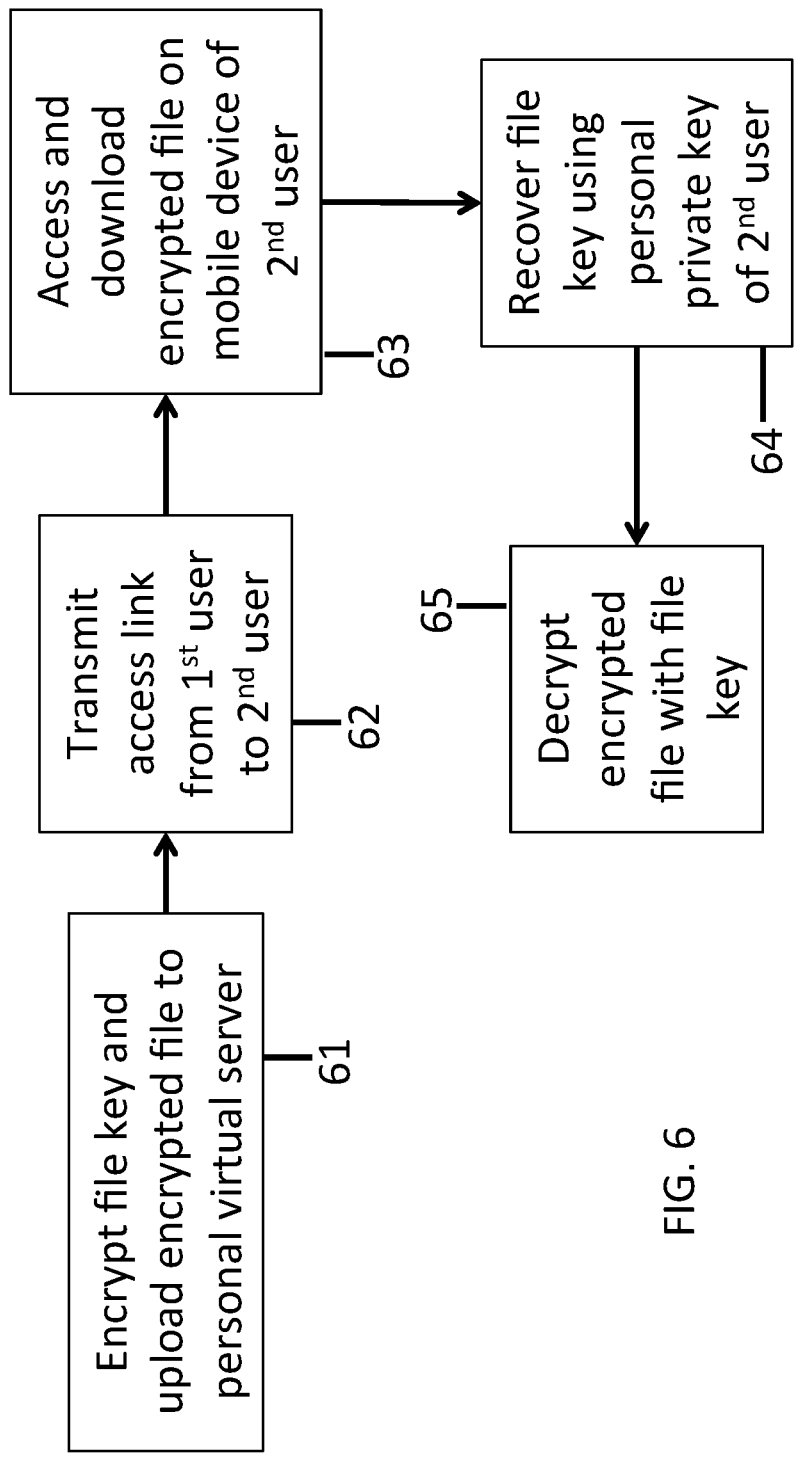
FIG. 6 is a flowchart of systems and methods for sharing files with other users.

One or more embodiments of methods and systems for storing data on a personal virtual server may further comprise configurations that allow the first user to share files with the second user or other users. FIG. 6 is a flowchart of a non-limiting embodiment of systems and methods for sharing files with other user. When the first user wants to share a file stored in his/her personal virtual server 4, the first user may have previously obtained a copy of the second user's personal public key as described above. As referenced above, an encrypted file may comprise of any number of headers followed by a ciphertext. The first user may download the header hdr containing its own identity, and decrypt the third component of the hdr using the first user's secret key to recover the file key. An application operating on the processor of the mobile device 2 may be configured to encrypt the file key 61 using a public-key encryption scheme and the personal public key of the second user. This results in a header $hdr_B=(B, pub, Enc'_{PKB}(k_f))$. The first may then upload $hdr_B$ to the personal virtual server, which prepends it to the encrypted file. The application may be further configured to transmit an access link from the first user to the second user 62 that allows the second user to access the encrypted file from the first user's personal virtual server.

Various systems and methods further comprise a mobile device of the second user. The application operating on the mobile device of the second user may be configured to access and download the encrypted file on the personal virtual server of the first user 63. The second user may access the encrypted file by finding the header $hdr_B=(B,*,*)$ containing its identity, and downloading that header plus the ciphertext (ctext). The second component of the header tells the second user to decrypt the third component of the header using the personal private key of the second user to recover the file key 64. The application is then configured to decrypt the cipher text using the file key 65 to recover the original file. The file may be encrypted at rest on the second user's phone, and only decrypted by the second user's application upon viewing. If the ability to revoke is desired, then the application may be configured to not store $hdr_B$ locally, but instead obtain it from the first user's personal virtual server 4 each time the second user tries to access the file. The first user can then revoke access by simply deleting $hdr_B$.

Figure 7:
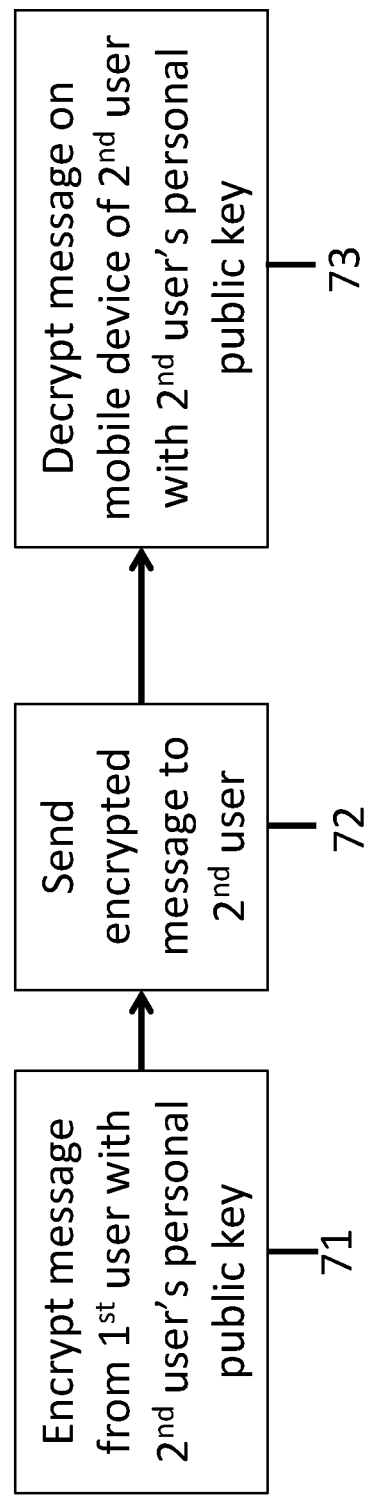
FIG. 7 is a flowchart of systems and methods for encrypted emailing and texting.

One or more embodiments of methods and systems for storing data on a personal virtual server may further comprise configurations that allow the users to engage in encrypted emailing and texting between one another. FIG. 7 is a flowchart of a non-limiting embodiment of systems and methods for encrypted emailing and texting. According to some embodiments, various types of mechanisms may be considered for sending encrypted messages (whether text or email), including those achieving forward secrecy and those not achieving achieve forward secrecy. Forward secrecy ensures that compromise of a recipient's long-term private key does not compromise security of any encrypted messages sent previously. While forward secrecy is desirable, it may require additional rounds of interaction.

In one or more embodiments, the application operating on the processor of the mobile device 2 of the first user is configured to encrypt a message using the second user's personal public key and a CCA-secure public-key encryption scheme 71, the message comprising at least one of a text message and an email message. This assumes that, as described above, the first user already has obtained a copy of the second user's public key. The application operating on the processor of the mobile device 2 may be further configured to send the encrypted message to the second user 72, and the application operating on the mobile device of the second user may be configured to decrypt the message with the $2^{nd}$ user's personal public key 73. If the first user and second user are communicating frequently, the system may be configured to establish a (temporary) shared key ($K_{AB}$) by, for example, having the first user encrypt $KA_B$ using $PK_B$. The two users can also use the shared key to encrypt their communication. In some embodiments, the key may be set to expire after some fixed or predetermined time.

To achieve forward secrecy, embodiments may include ensuring that users also generate personal public keys and personal private keys for a digital signature scheme, and that the corresponding personal public key may be securely distributed to other users. Then users who wish to communicate may then run an authenticated key-agreement protocol to agree on a shared key. The shared key may then be used to encrypt their texts and/or emails. In such embodiments, the ability to run the described protocol may require that both user be online.

It will be understood that implementations are not limited to the specific components disclosed herein, as virtually any components consistent with the intended operation of a method and/or system implementation for personal virtual servers may be utilized. Accordingly, for example, although particular personal virtual servers may be disclosed, such components may comprise any hardware, software, style, type, model, version, class, grade, and/or the like consistent with the intended operation of a method and/or system implementation for a personal virtual server may be used.

In places where the description above refers to particular implementations of personal virtual servers, it should be readily apparent that a number of modifications may be made without departing from the spirit thereof and that these implementations may be applied to other personal virtual servers The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A computerized system for storing data on a cloud-based personal virtual server, comprising:
   a first mobile device of a first user comprising a processor configured to:
   receive a first user's personal information, the first user's personal information comprising the phone number for the first mobile device, the first user's email address, and the mobile device identification of the first mobile device;
   receive the first user's password;
   generate a secret key, a personal public key, and a personal private key for the first user;
   launch a new server instance on a cloud-service provider to create a cloud-based personal virtual server for the first user on the cloud-service provider, the personal virtual server being segregated from other servers on the cloud-service provider; and
   transmit the personal information, the personal public key, and the password of the first user to the cloud-based personal virtual server for storage;
   wherein the processor of the first mobile device of the first user is further configured to transmit the secret key and the personal private key of the first user to the personal virtual server, and the system further comprises a second device comprising a processor configured to access data stored on the personal virtual server by receiving the first user's password and downloading the secret key and the personal private key of the first user to the second device.

2. The computerized system of claim 1, wherein the processor of the first mobile device of the first user is further configured to:
   generate a file key to encrypt a file;
   upload the encrypted file to the personal virtual server; and
   download the encrypted file from the virtual server to the first mobile device of the first user and decrypt the file using the file key.

3. The computerized system of claim 2, wherein the processor of the first mobile device of the first user is further configured to:
   transmit a request to a second user to learn a personal public key of the second user;
   transmit an email to the second user, the email comprising the personal public key of the first user as an attachment to the email and a first security code;
   transmit a text message to the second user, the text message comprising the personal public key of the first user and a second security code;
   receive a ciphertext in an email from the second user, the ciphertext comprising a personal public key for the second user and encrypted by the mobile device of the second user using the personal public key of the first user and chosen ciphertext attack (CCA)-secure public key encryption scheme;
   import the ciphertext and decrypt the ciphertext encrypted by the mobile device of the second user;
   verify an email address and phone number of the second user, and that the ciphertext was received within a predetermined time;
   accept the personal public key of the second user after verifying the email address and phone number of the second user, and that the ciphertext was received within a predetermined time; and
   store the personal public key of the second user and personal information of the second user in at least one of the personal virtual server and the mobile device of the first user.

4. The system of claim 3, wherein the processor of the first mobile device of the first user is further configured to:
   encrypt the file key using a public-key encryption scheme and the personal public key of the second user and upload the encrypted file key to the personal virtual server; and
   transmit an access link to the second user, the access link configured provide the second user with access to the encrypted file on the personal virtual server.

5. The system of claim 4, wherein the system further comprises a first mobile device of the second user comprising a processor configured to:
   access and download the encrypted file on the personal virtual server of the first user;
   recover the file key using a personal private key of the second user;
   decrypt the encrypted file with the file key.

6. The system of claim 3, wherein the processor of the first mobile device of the first user is further configured to:
   encrypt a message using the second user's personal public key and a CCA-secure public-key encryption scheme, the message comprising at least one of a text message and an email message; and
   send the encrypted message to the second user.

7. The system of claim 3, wherein the processor is further configured to establish a temporary shared key for the first user and the second user by having the first user encrypt the temporary shared key using the personal public key of the second user.

8. The system of claim 1, wherein the processor is further configured to:
   prompt the first user move the personal virtual server to a new datacenter in a location proximate the first user; and
   prompt the first user to split portions of data on stored on the personal virtual server such that a single file in the personal virtual server is stored in a plurality of datacenters.

9. A computerized method of storing data on a cloud-based personal virtual server, comprising:
   receiving, with a processor on a mobile device of a first user, the first user's personal information, the first user's personal information comprising the phone number for the first mobile device, the first user's email address, and the mobile device identification of the first mobile device;
   receiving, with the processor on the mobile device of the first user, a password for the first user;
   generating, with the processor on the mobile device of the first user, a secret key, a personal public key, and a personal private key for the first user;
   launching, with the processor on the mobile device of the first user through a communication network, a new server instance on a cloud-service provider to create a cloud-based personal virtual server for the first user on the cloud-service provider, the personal virtual server being segregated from other servers on the cloud-service provider;

transmitting, with the processor on the mobile device of the first user through the communication network, the personal information, the personal public key, and the password of the first user to the cloud-based personal virtual server for storage;
prompting, with the processor of the mobile device of the first user, the first user to move the personal virtual server to a new datacenter in a location proximate the first user; and
prompting, with the processor of the mobile device of the first user, the first user to split portions of data on stored on the personal virtual server such that a single file in the personal virtual server is stored in a plurality of datacenters.

10. The method of claim 9, further comprising:
generating, with the processor on the mobile device of the first user, a file key to encrypt a file;
uploading, with the processor on the mobile device of the first user through the communication network, the encrypted file to the personal virtual server; and
downloading, with the processor on the mobile device of the first user through the communication network, the encrypted file from the virtual server to the first mobile device and decrypt the file using the file key.

11. The method of claim 10, further comprising:
transmitting, with the processor on the mobile device of the first user, the secret key and the personal private key of the first user to the personal virtual server;
receiving, with a processor on a second device of the first user, the first user's password;
downloading, with the processor on the second device of the first user through the communication network, the secret key and the personal private key of the first user to the second device.

12. The method of claim 10, further comprising:
transmitting, with the processor on the mobile device of the first user through the communication network, a request to a second user to learn a personal public key of the second user;
transmitting, with the processor on the mobile device of the first user through the communication network, an email to the second user, the email comprising the personal public key of the first user as an attachment to the email and a first security code;
transmitting, with the processor on the mobile device of the first user through the communication network, a text message to the second user, the text message comprising the personal public key of the first user and a second security code;
receiving, with the processor on the mobile device of the first user through the communication network, a ciphertext in an email from the second user, the ciphertext comprising a personal public key for the second user and encrypted by the mobile device of the second user using the personal public key of the first user and chosen ciphertext attack (CCA)-secure public key encryption scheme;
importing, with the processor on the mobile device of the first user through the communication network, the ciphertext and decrypt the ciphertext encrypted by the mobile device of the second user;
verifying, with the processor on the mobile device of the first user, an email address and phone number of the second user, and that the ciphertext was received within a predetermined time;
accepting, with the processor on the mobile device of the first user, the personal public key of the second user after verifying the email address and phone number of the second user, and that the ciphertext was received within a predetermined time; and
storing, with the processor on the mobile device of the first user, the personal public key of the second user and personal information of the second user in at least one of the personal virtual server and the mobile device of the first user.

13. The method of claim 12, further comprising:
encrypting, with the processor on the mobile device of the first user, the file key using a public-key encryption scheme and the personal public key of the second user;
uploading, with the processor on the mobile device of the first user through the network, the encrypted file key to the personal virtual server; and
transmitting, with the processor on the mobile device of the first user through the communication network, an access link to the second user, the access link configured provide the second user with access to the encrypted file on the personal virtual server.

14. The method of claim 13, further comprising:
downloading, with a mobile device of the second user, the encrypted file on the personal virtual server of the first user;
recovering, with the mobile device of the second user, the file key using a personal private key of the second user;
decrypting, with the mobile device of the second user, the encrypted file with the file key.

15. The system of claim 13, further comprising:
encrypting, with the processor on the mobile device of the first user, a message using the second user's personal public key and a CCA-secure public-key encryption scheme, the message comprising at least one of a text message and an email message; and
sending, with the processor on the mobile device of the first user through the communication network, the encrypted message to the second user.

16. The system of claim 13, further comprising establishing, with the processor on the mobile device of the first user, a temporary shared key for the first user and the second user by having the first user encrypt the temporary shared key using the personal public key of the second user.

17. A computerized method of storing data on a cloud-based personal virtual server, comprising:
receiving, with a processor on a mobile device of a first user, the first user's personal information, the first user's personal information comprising the phone number for the first mobile device, the first user's email address, and the mobile device identification of the first mobile device;
receiving, with the processor on the mobile device of the first user, a password for the first user;
generating, with the processor on the mobile device of the first user, a secret key, a personal public key, and a personal private key for the first user;
launching, with the processor on the mobile device of the first user through a communication network, a new server instance on a cloud-service provider to create a cloud-based personal virtual server for the first user on the cloud-service provider, the personal virtual server being segregated from other servers on the cloud-service provider;
transmitting, with the processor on the mobile device of the first user through the communication network, the personal information, the personal public key, and the password of the first user to the cloud-based personal virtual server for storage;

generating, with the processor on the mobile device of the first user, a file key to encrypt a file;

uploading, with the processor on the mobile device of the first user through the communication network, the encrypted file to the personal virtual server; and downloading, with the processor on the mobile device of the first user through the communication network, the encrypted file from the virtual server to the first mobile device and decrypt the file using the file key;

transmitting, with the processor on the mobile device of the first user through the communication network, a request to a second user to learn a personal public key of the second user;

transmitting, with the processor on the mobile device of the first user through the communication network, an email to the second user, the email comprising the personal public key of the first user as an attachment to the email and a first security code;

transmitting, with the processor on the mobile device of the first user through the communication network, a text message to the second user, the text message comprising the personal public key of the first user and a second security code;

receiving, with the processor on the mobile device of the first user through the communication network, a ciphertext in an email from the second user, the ciphertext comprising a personal public key for the second user and encrypted by the mobile device of the second user using the personal public key of the first user and chosen ciphertext attack (CCA)-secure public key encryption scheme;

importing, with the processor on the mobile device of the first user through the communication network, the ciphertext and decrypt the ciphertext encrypted by the mobile device of the second user;

verifying, with the processor on the mobile device of the first user, an email address and phone number of the second user, and that the ciphertext was received within a predetermined time;

accepting, with the processor on the mobile device of the first user, the personal public key of the second user after verifying the email address and phone number of the second user, and that the ciphertext was received within a predetermined time; and storing, with the processor on the mobile device of the first user, the personal public key of the second user and personal information of the second user in at least one of the personal virtual server and the mobile device of the first user.

18. The method of claim 17, further comprising:

encrypting, with the processor on the mobile device of the first user, the file key using a public-key encryption scheme and the personal public key of the second user;

uploading, with the processor on the mobile device of the first user through the network, the encrypted file key to the personal virtual server; and transmitting, with the processor on the mobile device of the first user through the communication network, an access link to the second user, the access link configured provide the second user with access to the encrypted file on the personal virtual server.

19. The method of claim 18, further comprising:

transmitting, with the processor on the mobile device of the first user, the secret key and the personal private key of the first user to the personal virtual server;

receiving, with a processor on a second device of the first user, the first user's password;

downloading, with the processor on the second device of the first user through the communication network, the secret key and the personal private key of the first user to the second device.

20. The method of claim 18, further comprising:

downloading, with a mobile device of the second user, the encrypted file on the personal virtual server of the first user;

recovering, with the mobile device of the second user, the file key using a personal private key of the second user;

decrypting, with the mobile device of the second user, the encrypted file with the file key.

21. The system of claim 18, further comprising:

encrypting, with the processor on the mobile device of the first user, a message using the second user's personal public key and a CCA-secure public-key encryption scheme, the message comprising at least one of a text message and an email message; and sending, with the processor on the mobile device of the first user through the communication network, the encrypted message to the second user.

22. The system of claim 18, further comprising establishing, with the processor on the mobile device of the first user, a temporary shared key for the first user and the second user by having the first user encrypt the temporary shared key using the personal public key of the second user.

* * * * *